United States Patent
Han et al.

(10) Patent No.: US 12,043,287 B2
(45) Date of Patent: Jul. 23, 2024

(54) VEHICLE SAFETY SYSTEM FOR AUTONOMOUS VEHICLES

(71) Applicant: TuSimple, Inc., San Diego, CA (US)

(72) Inventors: Xiaoling Han, San Diego, CA (US); Yu-Ju Hsu, Tucson, AZ (US); Mohamed Hassan Ahmed Hassan Wahba, Tucson, AZ (US); Kun Zhang, San Diego, CA (US); Zehua Huang, San Diego, CA (US); Qiong Xu, San Diego, CA (US); Zhujia Shi, San Diego, CA (US); Yicai Jiang, Tucson, AZ (US); Junjun Xin, Tucson, AZ (US)

(73) Assignee: TUSIMPLE, INC., San Diego, CA (US)

( * ) Notice: Subject to any disclaimer, the term of this patent is extended or adjusted under 35 U.S.C. 154(b) by 0 days.

(21) Appl. No.: 18/151,442

(22) Filed: Jan. 8, 2023

(65) Prior Publication Data

US 2023/0159057 A1   May 25, 2023

Related U.S. Application Data

(63) Continuation of application No. 17/080,444, filed on Oct. 26, 2020, now Pat. No. 11,554,793.

(51) Int. Cl.
*B60W 60/00* (2020.01)
*B60W 30/08* (2012.01)
(Continued)

(52) U.S. Cl.
CPC ........ *B60W 60/0018* (2020.02); *B60W 30/08* (2013.01); *B60W 50/0205* (2013.01);
(Continued)

(58) Field of Classification Search
CPC ............ B60W 60/0018; B60W 30/08; B60W 50/0205; B60W 50/029; B60W 2050/021;
(Continued)

(56) References Cited

U.S. PATENT DOCUMENTS 10,766,523 B2 * 9/2020 Itou ........................... H02P 5/46
11,554,793 B2 * 1/2023 Han .................. B60W 50/0205
(Continued)

FOREIGN PATENT DOCUMENTS

CA       3059862 A1   10/2018
CN     110662681 A     1/2020
(Continued)

OTHER PUBLICATIONS

KR-20210090721-A translation (Year: 2019).*
(Continued)

*Primary Examiner* — Joseph M Rocca
*Assistant Examiner* — Kyle T Johnson
(74) *Attorney, Agent, or Firm* — Perkins Coie LLP

(57) ABSTRACT

Devices, systems, and methods for a vehicular safety system in autonomous vehicles are described. An example method for safely controlling a vehicle includes selecting, based on a first control command from a first vehicle control unit, an operating mode of the vehicle, and transmitting, based on the selecting, the operating mode to an autonomous driving system, wherein the first control command is generated based on input from a first plurality of sensors, and wherein the operating mode corresponds to one of (a) a default operating mode, (b) a minimal risk condition mode of a first type that configures the vehicle to pull over to a nearest pre-designated safety location, (c) a minimal risk condition mode of a second type that configures the vehicle to imme-
(Continued)

diately stop in a current lane, or (d) a minimal risk condition mode of a third type that configures the vehicle to come to a gentle stop.

20 Claims, 6 Drawing Sheets

(51) Int. Cl.
*B60W 50/02* (2012.01)
*B60W 50/029* (2012.01)
(52) U.S. Cl.
CPC ..... *B60W 50/029* (2013.01); *B60W 2050/021* (2013.01); *B60W 2050/0215* (2013.01); *B60W 2050/0297* (2013.01)
(58) Field of Classification Search
CPC . B60W 2050/0215; B60W 2050/0297; B60W 2050/0292; B60W 2420/42; B60W 2420/52; B60W 2556/50; B60W 50/023
See application file for complete search history.

(56) References Cited

U.S. PATENT DOCUMENTS

| | | | | |
|---|---|---|---|---|
| 2015/0142244 | A1* | 5/2015 | You | B60K 28/06 701/23 |
| 2016/0200421 | A1* | 7/2016 | Morrison | G05D 1/0077 244/17.23 |
| 2017/0123428 | A1* | 5/2017 | Levinson | G05D 1/0231 |
| 2018/0037223 | A1* | 2/2018 | Goto | B60W 30/143 |
| 2018/0240345 | A1* | 8/2018 | So | G08G 1/166 |
| 2018/0314255 | A1* | 11/2018 | Nistler | G07C 5/085 |
| 2018/0370540 | A1* | 12/2018 | Yousuf | G06F 11/1641 |
| 2019/0250622 | A1* | 8/2019 | Nister | G06V 20/584 |
| 2019/0329762 | A1* | 10/2019 | Kwon | B60W 30/0956 |
| 2020/0043258 | A1* | 2/2020 | Jiang | G07C 5/0825 |
| 2020/0156651 | A1* | 5/2020 | Golov | B60W 50/08 |
| 2020/0278692 | A1* | 9/2020 | Zhu | G05D 1/027 |
| 2020/0409360 | A1* | 12/2020 | Hwang | B60W 60/0015 |
| 2021/0163026 | A1* | 6/2021 | Ochida | B60W 60/0015 |
| 2021/0179123 | A1* | 6/2021 | Yamada | B60T 8/96 |
| 2021/0300425 | A1* | 9/2021 | Hyde | G05D 1/0088 |
| 2022/0126872 | A1* | 4/2022 | Han | B60W 30/08 |
| 2023/0311940 | A1* | 10/2023 | Kato | B60W 30/18163 |

FOREIGN PATENT DOCUMENTS

| | | | |
|---|---|---|---|
| CN | 110962845 A | | 4/2020 |
| CN | 111231965 A | | 6/2020 |
| DE | 102010041147 A1 | | 3/2012 |
| KR | 20170014026 A | | 2/2017 |
| KR | 20210090721 A | * 11/2019 | ...... B60W 60/00186 |
| KR | 102303539 B1 | | 9/2021 |
| WO | 2018069853 A1 | | 4/2018 |

OTHER PUBLICATIONS

"Surface Vehicle Recommended Practice: Taxonomy and Definitions for Terms Related to Driving Automation Systems for On-Road Motor Vehicles," SAE International, J3016, Jun. 2018.
"Road vehicles—Functional safety: Part 1: Vocabulary," International Standard, ISO 26262-1:2018, Dec. 2018.

* cited by examiner

VEHICLE SAFETY SYSTEM FOR AUTONOMOUS VEHICLES

CROSS-REFERENCE TO RELATED APPLICATIONS

This application is a continuation of U.S. patent application Ser. No. 17/080,444, filed on Oct. 26, 2020. The aforementioned application of which is incorporated by reference in its entirety.

TECHNICAL FIELD

This document generally relates to controlling vehicles, and in particular, a safety system for autonomous vehicles.

BACKGROUND

Autonomous vehicle navigation is a technology for sensing the position and movement of a vehicle and, based on the sensing, autonomously controlling the vehicle to navigate towards a destination. Autonomous vehicles have important applications in transportation of people, goods and services. A vehicle safety system that leverages redundancy to ensure continuous and robust autonomous operation is paramount for the safety of the vehicle and its passengers, as well as people and property in the vicinity of the vehicle.

SUMMARY

Disclosed are devices, systems and methods related to vehicular safety systems for autonomous vehicles. In an example, this is achieved by redundant vehicle control units (VCUs), each of which use separate sensors and different control loops to implement failure detection methods and fail-safe control methods, which work in conjunction with fail-operation systems, to ensure highly reliable operation.

In an aspect, the disclosed technology can be used to provide a method for safely controlling a vehicle. This method includes selecting, based on a first control command from a first vehicle control unit, an operating mode of the vehicle, and transmitting, based on the selecting, the operating mode to an autonomous driving system, wherein the first control command is generated by a first vehicle control unit based on input from a first plurality of sensors, wherein, in a case that an error is detected in the first control command, a second control command is generated by a second vehicle control unit based on input from a second plurality of sensors different from the first plurality of sensors, and wherein the operating mode corresponds to one of (a) a default operating mode, (b) a minimal risk condition mode of a first type that configures the vehicle to pull over to a nearest pre-designated safety location, (c) a minimal risk condition mode of a second type that configures the vehicle to immediately stop in a current lane, or (d) a minimal risk condition mode of a third type that configures the vehicle to come to a gentle stop.

In another aspect, the disclosed technology can be used to provide a system for safely controlling a vehicle. This system includes a first vehicle control unit configured to receive a first input from a first sensing unit, a second input from a first navigation system, and a third input from an object detection electronic control unit, and output at least a first control command based on processing the first input, the second input, and the third input, a second vehicle control unit configured to receive a fourth input from a second sensing unit, a fifth input from a second navigation system, and a sixth input from the object detection electronic control unit, and output at least a second control command based on processing the fourth input, the fifth input, and the sixth input, and a processor configured to select, based on the first control command, an operating mode of the vehicle, wherein the operating mode corresponds to one of (a) a default operating mode, (b) a minimal risk condition mode of a first type that configures the vehicle to pull over to a nearest pre-designated safety location, (c) a minimal risk condition mode of a second type that configures the vehicle to immediately stop in a current lane, or (d) a minimal risk condition mode of a third type that configures the vehicle to come to a gentle stop.

In yet another aspect, the above-described method is embodied in the form of processor-executable code and stored in a computer-readable program medium.

In yet another aspect, a device that is configured or operable to perform the above-described method is disclosed. The device may include a processor that is programmed to implement this method.

The above and other aspects and features of the disclosed technology are described in greater detail in the drawings, the description and the claims.

DETAILED DESCRIPTION

The transportation industry has been undergoing considerable changes in the way technology is used to control the operation of the vehicles. As exemplified in the automotive passenger vehicle, there has been a general advancement towards shifting more of the operational and navigational decision making away from the human driving and into on-board computing power. This is exemplified in the extreme by the numerous under-development autonomous vehicles. Current implementations are in intermediate stages, such as the partially-autonomous operation in some vehicles (e.g., autonomous acceleration and navigation, but with the requirement of a present and attentive driver), the safety-protecting operation of some vehicles (e.g., maintaining a safe following distance and automatic braking), the safety-protecting warnings of some vehicles (e.g., blind-spot indicators in side-view mirrors and proximity sensors), as well as ease-of-use operations (e.g., autonomous parallel parking).

Vehicle safety systems are critical as the autonomy of the vehicle increases. Traditional technology and implementations are ill-suited to provide operational safety for Level 4 (L4) systems, which according to SAE J3016 indicates a high level of driving automation that does not require a human driver for most conditions. Traditional vehicle safety systems are typically L2 systems, which are configured to only provide limited sensing information that cannot handle all operational scenarios. Furthermore, existing systems always have an on-board driver and thus cannot, by definition, meet the highest Automotive Safety Integrity Level (ASIL), i.e., ASIL D.

The default operating mode of an autonomous vehicle, which may be monitored by an automated driving system (ADS), can be changed to a minimal risk condition (MRC) mode if the vehicle safety system (VSS) detects that a current driving task cannot be adequately fulfilled or completed. The VSS determines which MRC mode that vehicle should shift to in order to ensure that the safety of the vehicle and the surroundings.

Figure 1:
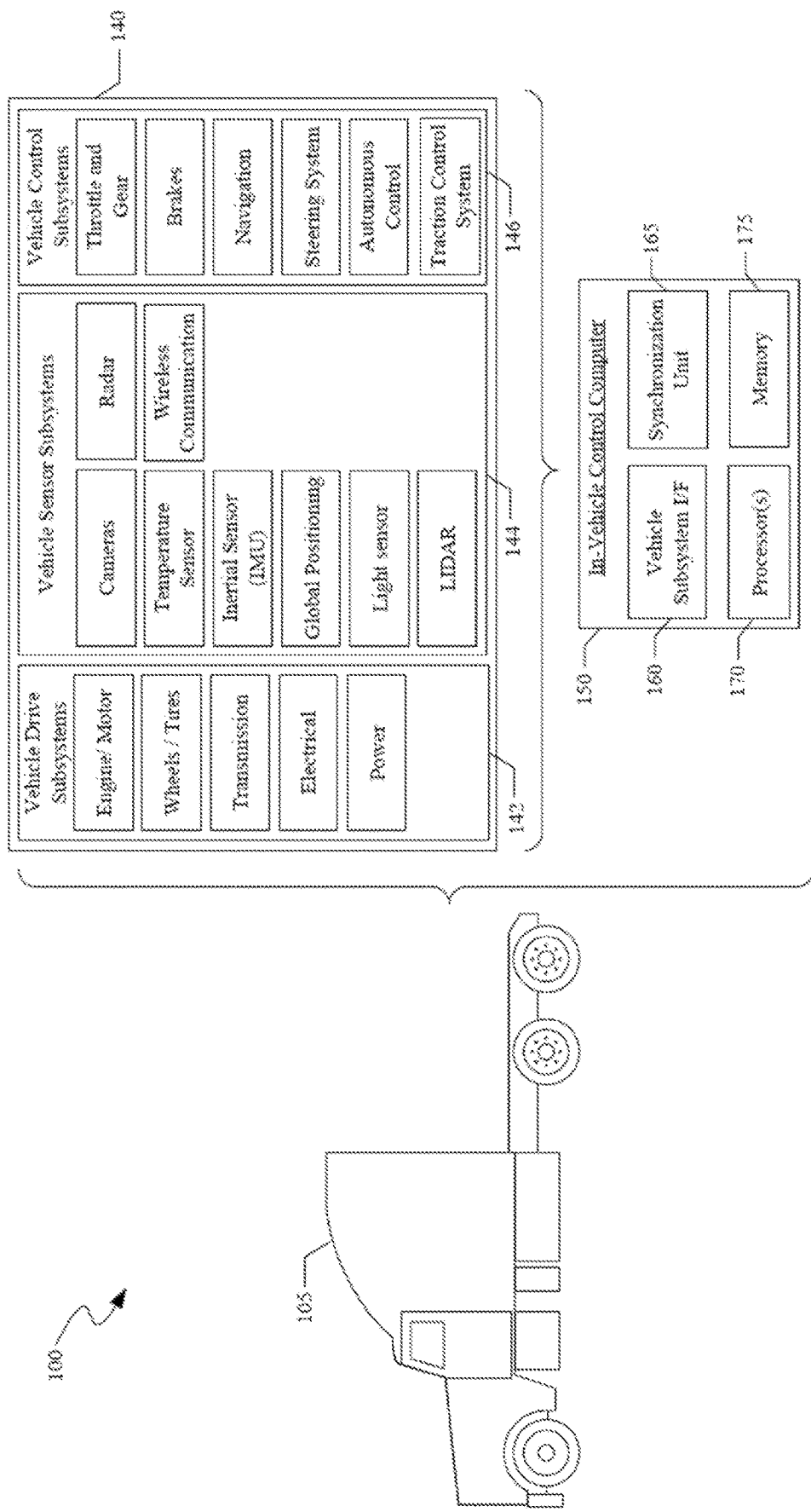
FIG. 1 shows a block diagram of an example vehicle ecosystem in which an in-vehicle control computer located in the vehicle comprises a vehicle safety system (VSS).

FIG. 1 shows a block diagram of an example vehicle ecosystem 100 in which an in-vehicle control computer 150 located in the autonomous vehicle 105 includes a synchronization unit that synchronizes multiple heterogeneous sensors. As shown in FIG. 1, the autonomous vehicle 105 may be a semi-trailer truck. The vehicle ecosystem 100 includes several systems and components that can generate and/or deliver one or more sources of information/data and related services to the in-vehicle control computer 150 that may be located in an autonomous vehicle 105. The in-vehicle control computer 150 can be in data communication with a plurality of vehicle subsystems 140, all of which can be resident in the autonomous vehicle 105. The in-vehicle computer 150 and the plurality of vehicle subsystems 140 can be referred to as autonomous driving system (ADS). A vehicle subsystem interface 160 is provided to facilitate data communication between the in-vehicle control computer 150 and the plurality of vehicle subsystems 140. In some embodiments, the vehicle subsystem interface 160 can include a controller area network controller to communicate with devices in the vehicle subsystems 140.

The autonomous vehicle 105 may include various vehicle subsystems that support of the operation of autonomous vehicle 105. The vehicle subsystems may include a vehicle drive subsystem 142, a vehicle sensor subsystem 144, and/or a vehicle control subsystem 146. The components or devices of the vehicle drive subsystem 142, the vehicle sensor subsystem 144, and the vehicle control subsystem 146 as shown as examples. In some embodiment, additional components or devices can be added to the various subsystems or one or more components or devices can be removed. The vehicle drive subsystem 142 may include components operable to provide powered motion for the autonomous vehicle 105. In an example embodiment, the vehicle drive subsystem 142 may include an engine or motor, wheels/tires, a transmission, an electrical subsystem, and a power source.

The vehicle sensor subsystem 144 may include a number of sensors configured to sense information about an environment in which the autonomous vehicle 105 is operating or a condition of the autonomous vehicle 105. The vehicle sensor subsystem 144 may include one or more cameras or image capture devices, one or more temperature sensors, an inertial measurement unit (IMU), a Global Positioning System (GPS) device, a laser range finder/LiDAR unit, a RADAR unit, an ultrasonic sensor, and/or a wireless communication unit (e.g., a cellular communication transceiver). The vehicle sensor subsystem 144 may also include sensors configured to monitor internal systems of the autonomous vehicle 105 (e.g., an 02 monitor, a fuel gauge, an engine oil temperature, etc.). In some embodiments, the vehicle sensor subsystem 144 may include sensors in addition to the sensors shown in FIG. 1.

The IMU may include any combination of sensors (e.g., accelerometers and gyroscopes) configured to sense position and orientation changes of the autonomous vehicle 105 based on inertial acceleration. The GPS device may be any sensor configured to estimate a geographic location of the autonomous vehicle 105. For this purpose, the GPS device may include a receiver/transmitter operable to provide information regarding the position of the autonomous vehicle 105 with respect to the Earth. The RADAR unit may represent a system that utilizes radio signals to sense objects within the environment in which the autonomous vehicle 105 is operating. In some embodiments, in addition to sensing the objects, the RADAR unit may additionally be configured to sense the speed and the heading of the objects proximate to the autonomous vehicle 105. The laser range finder or LiDAR unit may be any sensor configured to sense objects in the environment in which the autonomous vehicle 105 is located using lasers. The LiDAR unit may be a spinning LiDAR unit or a solid-state LiDAR unit. The cameras may include one or more cameras configured to capture a plurality of images of the environment of the autonomous vehicle 105. The cameras may be still image cameras or motion video cameras.

The vehicle control subsystem 146 may be configured to control operation of the autonomous vehicle 105 and its components. Accordingly, the vehicle control subsystem 146 may include various elements such as a throttle and gear, a brake unit, a navigation unit, a steering system and/or an autonomous control unit. The throttle may be configured to control, for instance, the operating speed of the engine and, in turn, control the speed of the autonomous vehicle 105. The gear may be configured to control the gear selection of the transmission. The brake unit can include any combination of mechanisms configured to decelerate the autonomous vehicle 105. The brake unit can use friction to slow the wheels in a standard manner. The brake unit may include an Anti-lock brake system (ABS) that can prevent the brakes from locking up when the brakes are applied. The navigation unit may be any system configured to determine a driving path or route for the autonomous vehicle 105. The navigation unit may additionally be configured to update the driving path dynamically while the autonomous vehicle 105 is in operation. In some embodiments, the navigation unit may be configured to incorporate data from the GPS device and one or more predetermined maps so as to determine the driving path for the autonomous vehicle 105. The steering system may represent any combination of mechanisms that may be operable to adjust the heading of autonomous vehicle 105 in an autonomous mode or in a driver-controlled mode.

The autonomous control unit may represent a control system configured to identify, evaluate, and avoid or otherwise negotiate potential obstacles in the environment of the autonomous vehicle 105. In general, the autonomous control unit may be configured to control the autonomous vehicle 105 for operation without a driver or to provide driver assistance in controlling the autonomous vehicle 105. In some embodiments, the autonomous control unit may be configured to incorporate data from the GPS device, the RADAR, the LiDAR, the cameras, and/or other vehicle subsystems to determine the driving path or trajectory for the autonomous vehicle 105.

The traction control system (TCS) may represent a control system configured to prevent the autonomous vehicle 105 from swerving or losing control while on the road. For example, TCS may obtain signals from the IMU and the engine torque value to determine whether it should intervene and send instruction to one or more brakes on the autonomous vehicle 105 to mitigate the autonomous vehicle 105 swerving. TCS is an active vehicle safety feature designed to help vehicles make effective use of traction available on the road, for example, when accelerating on low-friction road surfaces. When a vehicle without TCS attempts to accelerate on a slippery surface like ice, snow, or loose gravel, the wheels can slip and can cause a dangerous driving situation. TCS may also be referred to as electronic stability control (ESC) system.

Many or all of the functions of the autonomous vehicle 105 can be controlled by the in-vehicle control computer 150. The in-vehicle control computer 150 may include at least one processor 170 (which can include at least one microprocessor) that executes processing instructions stored in a non-transitory computer readable medium, such as the memory 175. The in-vehicle control computer 150 may also represent a plurality of computing devices that may serve to control individual components or subsystems of the autonomous vehicle 105 in a distributed fashion. In some embodiments, the memory 175 may contain processing instructions (e.g., program logic) executable by the processor 170 to perform various methods and/or functions of the autonomous vehicle 105, including those described for the vehicle safety system (VSS) 165 as explained in this patent document. For instance, the processor 170 executes the operations associated with the VSS 165 for ensuring safe operation of the autonomous vehicle, which includes switching from a default operating mode to a minimal risk condition (MRC) mode. The operations of the VSS 165 are further described in this patent document.

The memory 175 may contain additional instructions as well, including instructions to transmit data to, receive data from, interact with, or control one or more of the vehicle drive subsystem 142, the vehicle sensor subsystem 144, and the vehicle control subsystem 146. The in-vehicle control computer 150 may control the function of the autonomous vehicle 105 based on inputs received from various vehicle subsystems (e.g., the vehicle drive subsystem 142, the vehicle sensor subsystem 144, and the vehicle control subsystem 146).

Embodiments of the disclosed technology are configured to provide a vehicle safety system (VSS) for L4 autonomy (as defined by SAE J3016). In an example, this may be achieved by using multiple and redundant sensors, as well as different control loops, to implement both failure detection and fail-safe control. The VSS ensures that the appropriate operating mode for the vehicle is selected based on the health/operational status of the components that are operating the vehicle.

Figure 2:
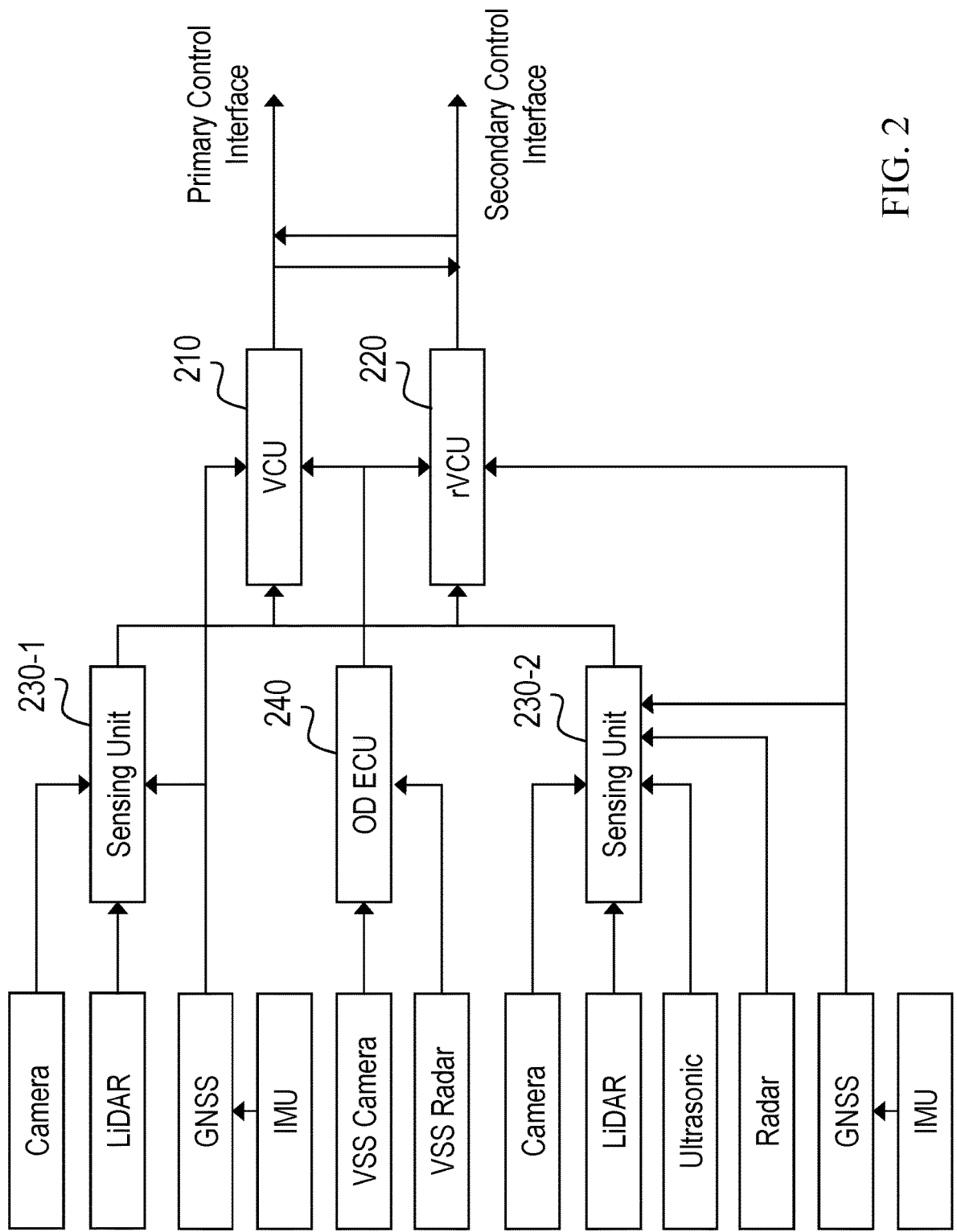
FIG. 2 shows a block diagram of an example of a VSS.

FIG. 2 shows a block diagram of an example of a VSS, which includes a primary vehicle control unit (VCU) 210 and a secondary (or redundant) VCU 220, whose outputs are responsible for the operation of the vehicle control components and are transmitted through a primary control interface and a secondary control interface, respectively. As shown in FIG. 2, each of the primary and secondary VCUs is coupled to a first sensing unit 230-1, a second sensing unit 230-2, and an object detection (OD) electronic control unit (ECU) 240. The primary VCU 210 is additionally coupled to a first Global Navigation Satellite System (GNSS) unit and a first inertial measurement unit (IMU), and the secondary VCU 220 is additionally coupled to second (and separate) GNSS and IMU units. Furthermore, the first sensing unit 230-1 receives inputs from a first set of sensors and the first GNSS/IMU units, and the second sensing unit 230-2 receives inputs from a second set of sensors and the second GNSS/IMU units. In this example, the first set of sensors includes a camera and a LiDAR unit, and the second set of sensors includes another camera, another LiDAR unit, an ultrasonic sensor and a radar unit.

In some embodiments, the VSS works as a hot backup system wherein both the primary and secondary VCUs are always online, performing computations, and executing logic even when the system is functionality properly. The secondary VCU remains in an active standby mode, which advantageously enables it to immediately take over as soon as a failure in the primary VCU is detected. In an example, the VSS system configures the primary and secondary VCUs such that a healthy VCU can assume control within 10 ms of a failure having been detected in the other VCU.

In some embodiments, the input to the VSS includes the outputs of the first and second sensor sets and the output of an autonomous monitoring and diagnostic (AMD) system, and the output of the VSS are executable commands for the vehicle control components. The VSS works in conjunction with the AMD system to ensure that all errors are handled by the VSS and reasonable results are produced.

In some embodiments, the redundancy of the VSS advantageously enables it to meet the ASIL D requirements (ASIL D is defined in ISO 26262). At this level, the disclosed redundant framework can safely operate in high exposure operational situations (e.g., more than 10% typical operational time) where a malfunction can lead to high severity harm (e.g., death or major bodily harm) with very low controllability (e.g., less than 90% of average drivers or other traffic participants are able to avoid harm).

In some embodiments, to improve the redundancy, the primary and secondary VCUs are configured to operate using separate power supplies and separate ignition signal sources.

In some embodiments, sensor outputs are provided separately to the primary and secondary VCUs. In the example shown in FIG. 2, the first set of sensors provides inputs to the primary VCU and the second (and distinct) set of sensors provides inputs to the secondary VCU. In another example, the first and second sets of sensors include identical components, e.g., a camera, a LiDAR unit and a radar unit.

The VSS and the health/operational status of the primary and secondary VCUs are used to determine which VCU remains in control and to determine the operating mode of the vehicle. In some embodiments, the operating mode of the vehicle is selected from one of the following modes:

Default operating mode;

MRC mode of a first type (denoted MRC1) that configures the vehicle to pull over to a nearest pre-designated safety location;

MRC mode of a second type (denoted MRC2) that configures the vehicle to immediately stop in a current lane; and MRC mode of a third type (denoted MRC3) that configures the vehicle to come to a gentle stop.

Figure 3:
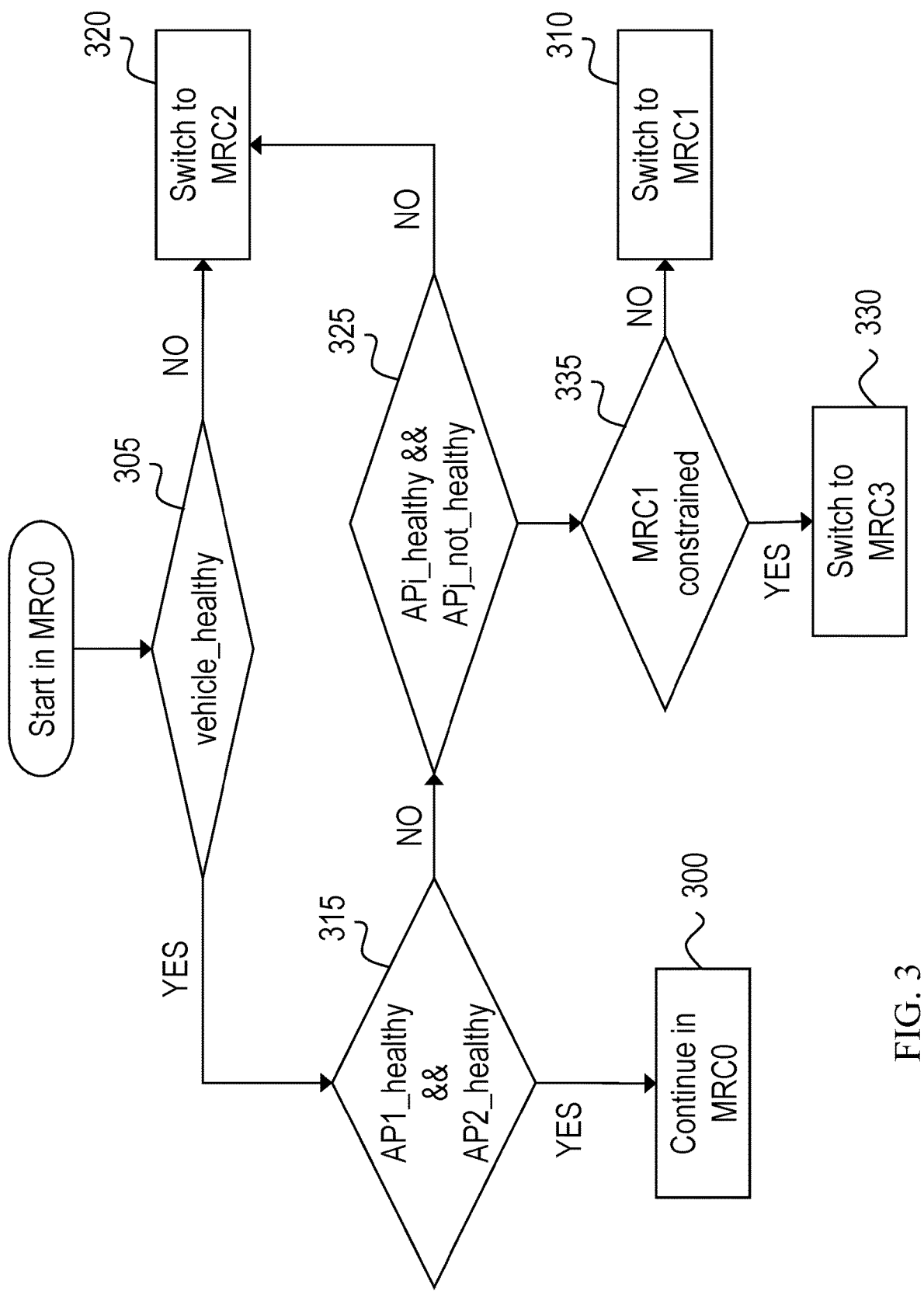
FIG. 3 shows an example of arbitration logic that switches between default operation and minimal risk condition (MRC) modes.

FIG. 3 shows an example of arbitration logic that switches between default operation and MRC modes. As shown therein, the operating mode of the vehicle is determined based on, but not limited to, the following parameters:

Autopilot 1 (AP1) health corresponding to primary VCU health

AP2 health corresponding to secondary VCU health

Vehicle health

MRC1 constrained status corresponding to the inability of the vehicle to find and maneuver to a pre-designated safety location In the example shown in FIG. 3, the following statuses (which are explanations, not definitions) are considered:
AP healthy when (HealthAP ≤10)
AP not healthy when (HealthAP >10)
Vehicle healthy when (10<HealthVeh<40)
Vehicle not healthy when (HealthVeh ≥40)

The values 10 and 40 are exemplary threshold values corresponding to error or warning messages received or any other relevant metric or criteria. In some embodiments, the thresholds used to define whether the autopilot and vehicle are healthy or not may be determined based on the specific vehicle and/or use case (e.g., whether a specific cargo is being hauled that may necessitate extra caution).

An example of the arbitration logic that determines the optimal operating mode for the vehicle is based on the following rules:

---

1. Operate in default operating mode (denoted MRC0 in FIG. 3)
2. If ( AP1_healthy && AP2_not_healthy && vehicle_healthy )
    If ( MRC1_constrained == true )
      Switch to MRC3
    Otherwise
      Switch to MRC1
3. If ( ( AP1_not_healthy && AP2_not_healthy ) || (disengage autonomous mode) || vehicle_not_healthy )
    Switch to MRC2

---

This arbitration logic described above is shown in FIG. 3, wherein the vehicle is initially operating in MRC0. If the vehicle is healthy (YES at 305) and both autopilots (AP1 and AP2) are healthy (YES at 315), then the vehicle continues operating in MRC0 (300). However, if the vehicle is not healthy (NO at 305), then the vehicle switches to MRC2 (320).

However, if both AP1 and AP2 are not healthy (NO at 315), then the arbitration logic determines whether at least one of the autopilots are healthy (indicated as APi being healthy and APj being not healthy). If both autopilots are not healthy (NO at 325), the vehicle switches to MRC2 (320). If at least one of the autopilots is healthy (YES at 325), then the arbitration logic checks with MRC1 is constrained, i.e., the vehicle cannot find and maneuver to a pre-designated safety location. If MRC1 is not constrained (NO at 335), the vehicle switches to MRC1 (310), otherwise the vehicle switches to MRC3 (330).

Figure 4:
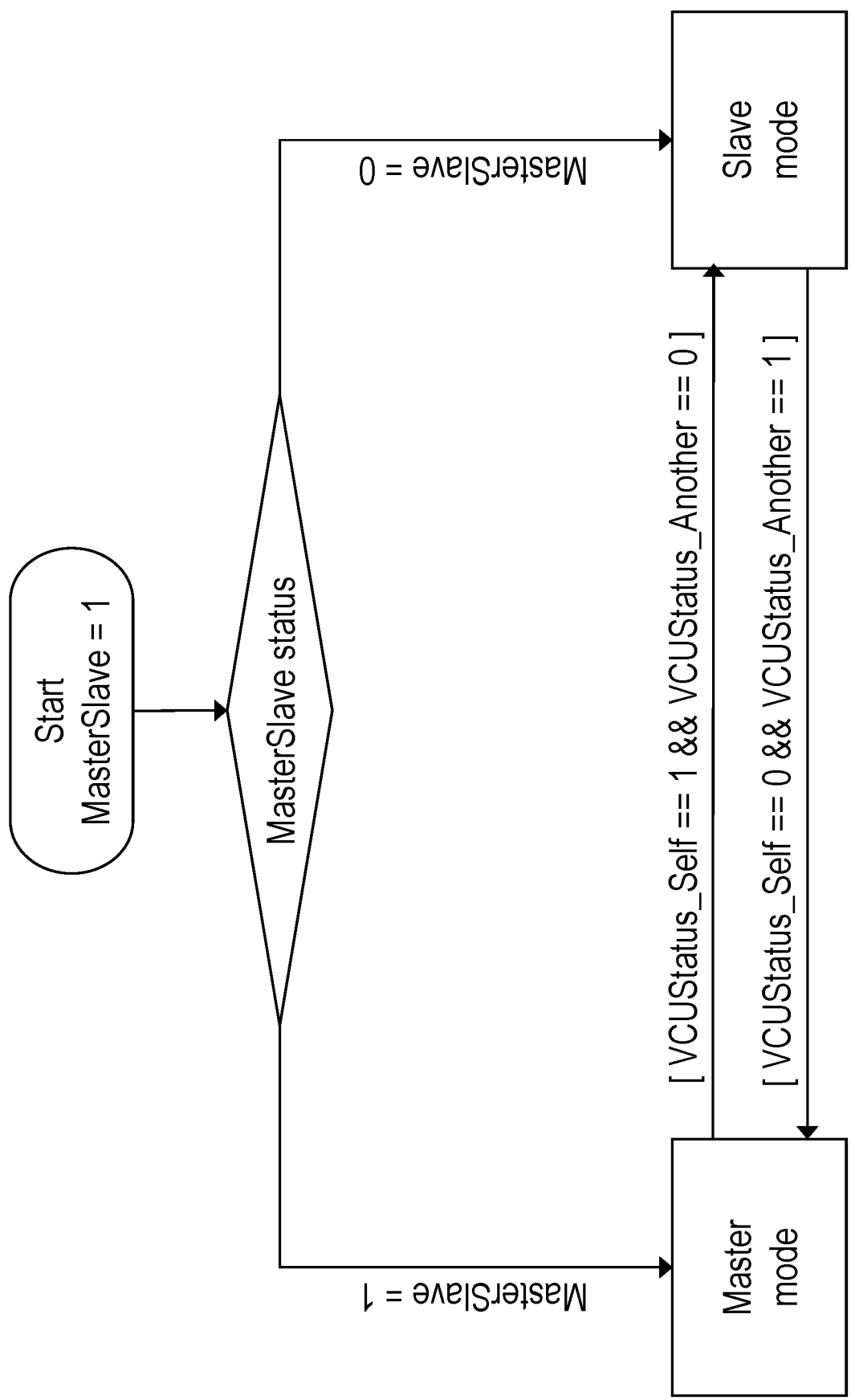
FIG. 4 shows an example of arbitration logic that selects a VCU.

FIG. 4 shows an example of arbitration logic that selects a VCU, and is based on the primary and secondary VCUs being able to self-configure into a master/slave relationship. As shown therein, the VCU selection arbitration logic starts with "MasterSlave=1," which sets the primary VCU as operating in master mode, whereas "MasterSlave=0" sets the secondary VCU as operating in master mode (and the primary VCU as operating in slave mode). The self-configuration aspect of the VCUs is shown in the communication between them, wherein if the primary VCU experiences a failure or outputs an error status (corresponding to VCUStatus_Self=1), the secondary VCU takes over and becomes the master in the master/slave relationship. As discussed above, the primary and secondary VCUs operate in a hot backup configuration.

Figure 5:
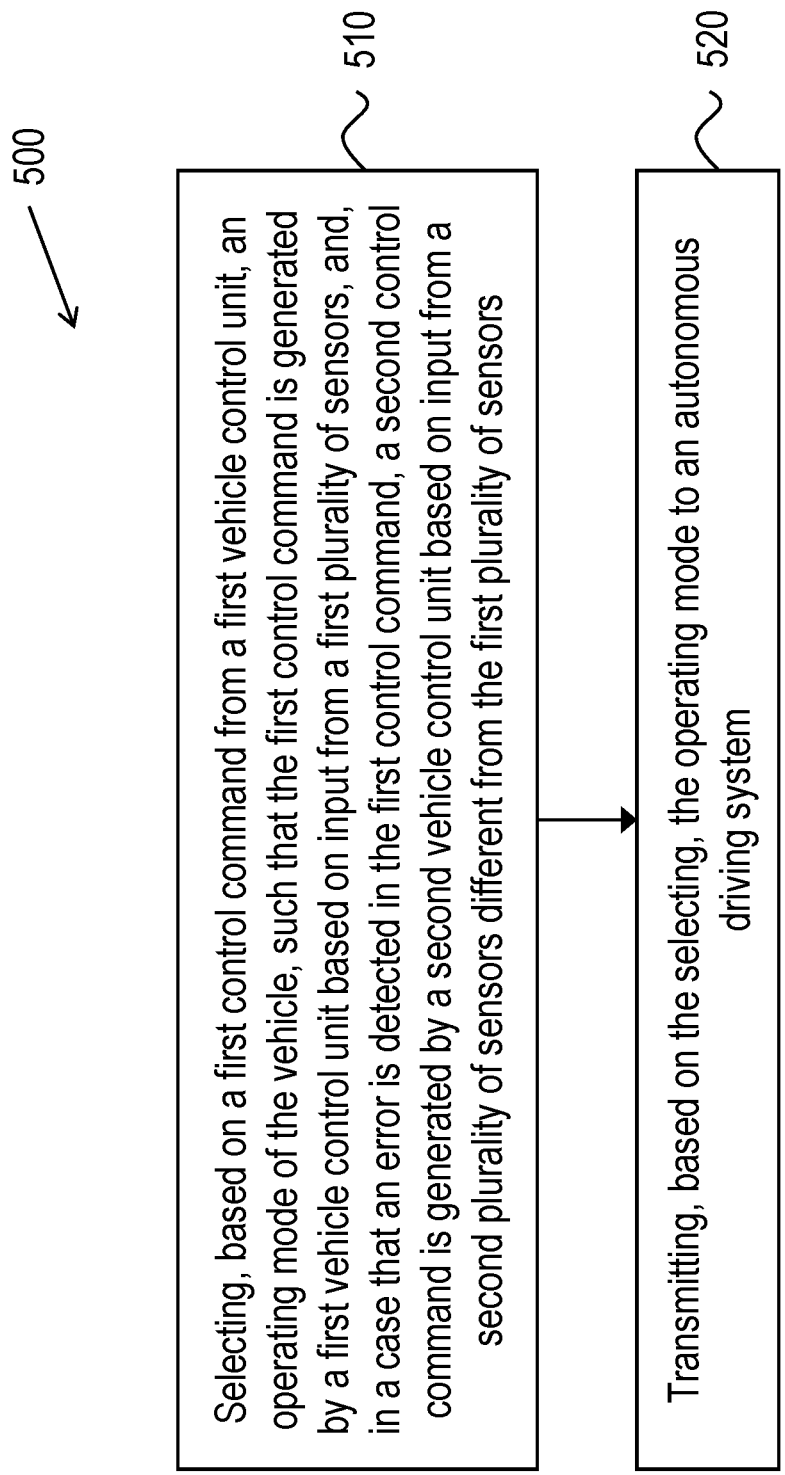
FIG. 5 shows a flowchart of an example method for controlling a vehicle.

FIG. 5 shows a flowchart for an example method 500 for controlling a vehicle. The method 500 includes, at operation 510, selecting, based on a first control command from a first vehicle control unit, an operating mode of the vehicle, such that the first control command is generated by a first vehicle control unit based on input from a first plurality of sensors, and, in a case that an error is detected in the first control command, a second control command is generated by a second vehicle control unit based on input from a second plurality of sensors different from the first plurality of sensors.

The method 500 includes, at operation 520, transmitting, based on the selecting, the operating mode to an autonomous driving system, the operating mode corresponding to one of (a) a default operating mode, (b) a minimal risk condition mode of a first type that configures the vehicle to pull over to a nearest pre-designated safety location, (c) a minimal risk condition mode of a second type that configures the vehicle to immediately stop in a current lane, or (d) a minimal risk condition mode of a third type that configures the vehicle to come to a gentle stop.

In some embodiments, the first plurality of sensors comprises a first Global Navigation Satellite System (GNSS), a first inertial measurement unit (IMU), a first camera and a first light detection and ranging (LiDAR) system.

In some embodiments, the second plurality of sensors comprises a second GNSS, a second inertial measurement unit (IMU), a second camera, a second light detection and ranging (LiDAR) system, a radar sensor, and an ultrasonic sensor.

In some embodiments, the method 500 further includes the operation of providing, upon a determination that at least one of the first plurality of sensors has generated a failure indication, an output from a corresponding sensor from the second plurality of sensors to the first vehicle control unit.

In some embodiments, the first control command and the second control command are generated by the first vehicle control unit and the second vehicle control unit, respectively, further based on (a) a vehicle safety system (VSS) camera that is different from the first camera and the second camera and (b) a VSS radar that is different from the radar sensor.

In some embodiments, control of the vehicle adheres to Automotive Safety Integrity Level D (ASIL D) requirements.

In some embodiments, the first vehicle control unit comprises a first autopilot unit and the second vehicle control unit comprises a second autopilot unit, and the method 500 further includes the operation of selecting, based on plurality of rules, the operating mode of the vehicle.

In some embodiments, the plurality of rules comprises (i) continue operation in the default operating mode if the first autopilot unit is healthy, the second autopilot unit is healthy, and the vehicle is healthy, (ii) switch to operation in the minimal risk condition mode of the first type if the vehicle is healthy and either the first autopilot unit or the second autopilot unit is not healthy, (iii) switch to operation in the minimal risk condition mode of the second type if the vehicle is not healthy or both the first autopilot unit and the second autopilot unit are not healthy, and (iv) switch to operation in the minimal risk condition mode of the third type if the vehicle is healthy, switching to operation in the minimal risk condition mode of the first type is not available, and either the first autopilot unit or the second autopilot unit is not healthy.

In some embodiments, switching to operation in the minimal risk condition of the first type is not available corresponds to at least the pre-designated safety location not being accessible.

In some embodiments, the first autopilot unit, the second autopilot unit, or the vehicle being healthy corresponds to a health metric for the first autopilot unit, a health metric for the second autopilot unit, or a vehicle health metric, respectively, being less than or equal to a first threshold, the first autopilot unit or the second autopilot unit not being healthy corresponds to the health metric for the first autopilot unit or the health metric the second autopilot unit being greater than the first threshold, respectively, and the vehicle not being healthy corresponds to the vehicle health metric being greater than a second threshold.

In some embodiments, the method 500 further comprises the operations of detecting, prior to selecting the operating mode, the error in the first control command, and transmitting, with ten milliseconds of detecting the failure, the operating mode to the autonomous driving system, wherein selecting the operating mode is further based on the second control command.

Embodiments of the disclosed technology include a vehicle safety system for controlling a vehicle. An example system includes a first vehicle control unit configured to receive a first input from a first sensing unit, a second input from a first navigation system, and a third input from an object detection electronic control unit, and output at least a first control command based on processing the first input, the second input, and the third input, a second vehicle control unit configured to receive a fourth input from a second sensing unit, a fifth input from a second navigation system, and a sixth input from the object detection electronic control unit, and output at least a second control command based on processing the fourth input, the fifth input, and the sixth input, and a processor configured to select, based on the first control command, an operating mode of the vehicle, wherein the operating mode corresponds to one of (a) a default operating mode, (b) a minimal risk condition mode of a first type that configures the vehicle to pull over to a nearest pre-designated safety location, (c) a minimal risk condition mode of a second type that configures the vehicle to immediately stop in a current lane, or (d) a minimal risk condition mode of a third type that configures the vehicle to come to a gentle stop.

In some embodiments, the first navigation system comprises a Global Navigation Satellite System (GNSS).

In some embodiments, the first sensing unit comprises a first camera and a first light detection and ranging (LiDAR) system.

In some embodiments, the second sensing unit comprises a second camera, a second LiDAR system, a radar sensor, and an ultrasonic sensor.

In some embodiments, the object detection electronic control unit receives a first input from a vehicle safety system (VSS) camera and a second input from a VSS radar.

In some embodiments, the vehicle is operating in an L4 autonomous driving mode.

In some embodiments, the system further comprises a first power source configured to power the first vehicle control unit, and a second power source, different from the first power source, configured to power the second vehicle control unit.

In some embodiments, the first vehicle control unit is configured to receive a first ignition signal and the second vehicle control unit is configured to receive a second ignition signal different from the first ignition signal.

Figure 6:
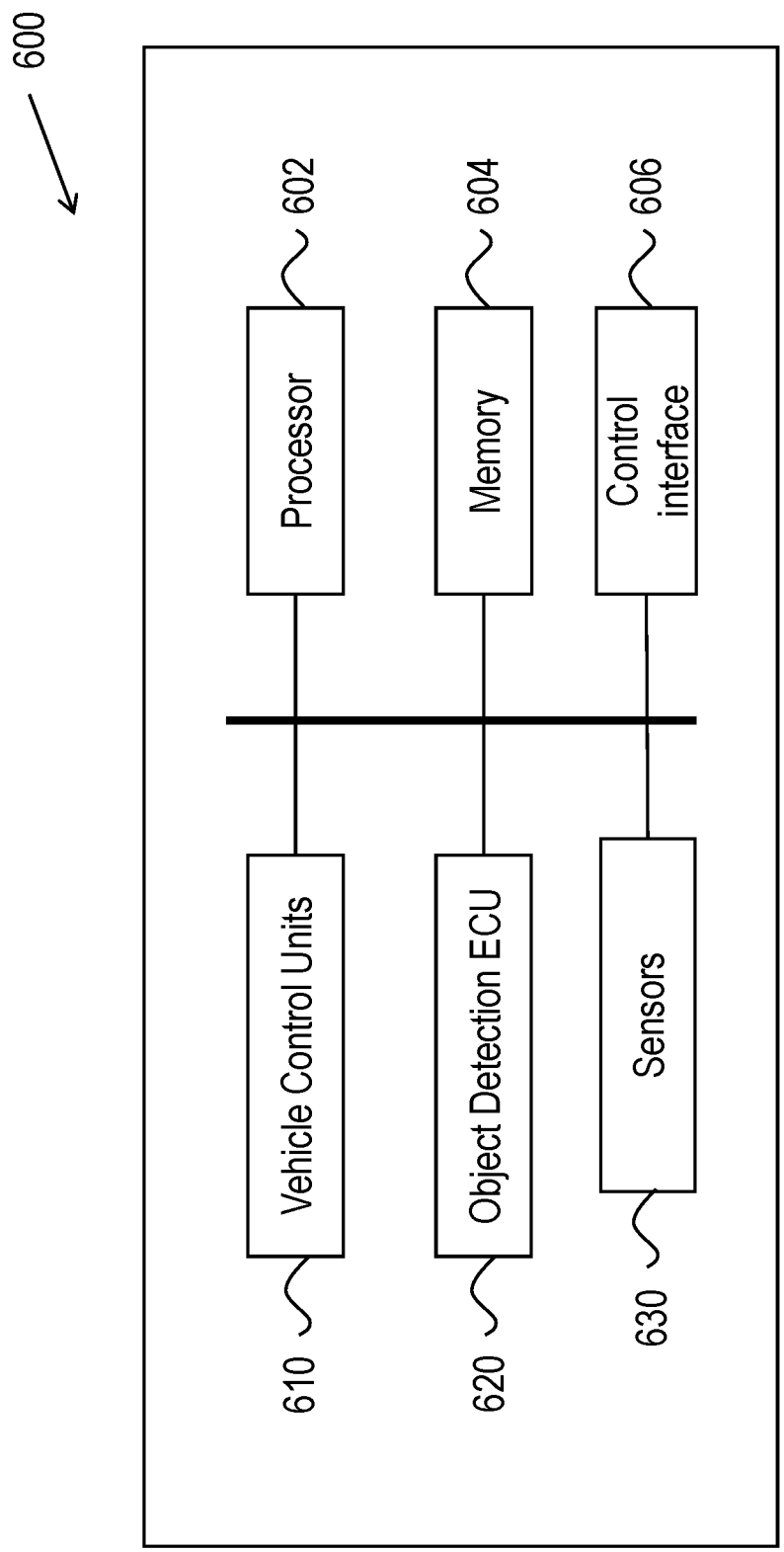
FIG. 6 shows an example of a hardware platform that can implement some methods and techniques described in the present document.

FIG. 6 shows an example of a hardware platform 600 that can be used to implement some of the techniques described in the present document. For example, the hardware platform 600 may implement method 500 or may implement the various modules described herein. The hardware platform 600 may include a processor 602 that can execute code to implement a method. The hardware platform 600 may include a memory 604 that may be used to store processor-executable code and/or store data. The hardware platform 600 may further include a control interface 606. For example, the control interface 606 may implement one or more intra-vehicular communication protocols. The hardware platform may further include vehicle control units (VCUs) 610, an object detection (OD) ECU 620, and sensors 630. In some embodiments, some portion or all of the VCUs 610 and the OD ECU 620 may be implemented in the processor 602. In other embodiments, the memory 604 may comprise multiple memories, some of which are exclusively used by the mission planner, control decoupler and/or longitudinal MPC.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A vehicle system, comprising:
   a first control unit configured to
      receive a first plurality of inputs from a first sensing unit, a first navigation system, and an object detection (OD) electronic control unit (ECU), and generate at least a first control command based on the first plurality of inputs;
   a second control unit configured to
      receive a second plurality of inputs from a second sensing unit, a second navigation system, and the OD ECU, and generate at least a second control command based on the second plurality of inputs; and
   a processor configured to select, based on the first control command or the second control command, an operating mode of a vehicle,
      wherein the operating mode corresponds to at least one of (a) a default mode that allows the vehicle to operate without changing operating mode, (b) a first mode that allows the vehicle to pull over to a location, (c) a second mode that allows the vehicle to immediately stop, or (d) a third mode that allows the vehicle to come to a gentle stop,
   wherein the processor is further configured to:
   switch the operating mode from the default mode to one selected from the first mode, the second mode, and the third mode, wherein switch the operating mode is determined based on a constrained status of the first mode.

2. The vehicle system of claim 1, wherein the first control unit comprises a first autopilot, wherein the second control unit comprises a second autopilot,
   wherein the processor is further configured to: determine 1) whether the vehicle is healthy, 2) whether the first autopilot is healthy, or 3) whether the second autopilot is healthy,
   wherein switch the operating mode is determined based on at least one of the determination of 1), 2) or 3).

3. The vehicle system of claim 2, wherein the first autopilot is determined as healthy when its health parameter is less or equal to a first threshold value corresponding to error or warning message received or any other related metric or criteria.

4. The vehicle system of claim 2, wherein the second autopilot is determined as healthy when its health parameter is less or equal to a second threshold value corresponding to error or warning message received or any other related metric or criteria.

5. The vehicle system of claim 2, wherein the vehicle is determined as healthy when its health parameter is between a third threshold value and a fourth threshold value, wherein the third threshold value and the fourth threshold value correspond to error or warning message received or any other related metric or criteria.

6. The vehicle system of claim 1, wherein the first sensing unit or the second sensing unit comprises a first camera and a first light detection and ranging (LiDAR) system.

7. A method of controlling a vehicle, comprising:
   determining, based on a first control command from a first control unit, an operating mode of the vehicle; and
   transmitting the operating mode to an autonomous driving system,
      wherein the first control command is generated by the first control unit based on input from a first plurality of sensors,
      wherein, in a case that an error is detected in the first control command, a second control command is generated by a second control unit based on input from a second plurality of sensors, and
      wherein the operating mode corresponds to at least one of (a) a default mode that allows the vehicle to operate without changing the operating mode, (b) a first mode that allows the vehicle to pull over to a location, (c) a second mode that allows the vehicle to immediately stop, or (d) a third mode that allows the vehicle to come to a gentle stop; and switching the operating mode from the default mode to one selected from the first mode, the second mode, and the third mode, wherein switching the operating mode is determined based on a constrained status of the first mode.

8. The method of claim 7, further comprising: two power sources configured to power the first vehicle control unit and the second vehicle control unit.

9. The method of claim 8, wherein the first vehicle control unit and the second vehicle control unit are configured to receive ignition signals.

10. The method of claim 7, wherein the method further comprises: making a first determination whether the vehicle is healthy; and making a second determination on a health status of a first autopilot unit and a health status of a second autopilot unit, wherein the first autopilot unit is associated with the first control unit, wherein the second autopilot unit is associated with the second control unit, wherein switching the operating mode is determined based on at least one of the first determination and the second determination.

11. The method of claim 10, wherein the first autopilot unit is determined as healthy when its health parameter is less or equal to a first threshold value corresponding to error or warning message received or any other related metric or criteria.

12. The method of claim 10, wherein the second autopilot unit is determined as healthy when its health parameter is less or equal to a second threshold value corresponding to error or warning message received or any other related metric or criteria.

13. The method of claim 10, wherein the vehicle is determined as healthy when its health parameter between a third threshold value and a fourth threshold value, wherein the third threshold value and the fourth threshold value correspond to error or warning message received or any other related metric or criteria.

14. The method of claim 7, further comprising: two power sources configured to power the first control unit and the second control unit.

15. The method of claim 7, further comprising: a first ignition signal received by the first control unit and a second ignition signal, different from the first ignition signal, received by the second control unit.

16. A device for controlling a vehicle, comprising:
a processor configured to:
determine, based on an input from an autonomous monitoring and diagnostic system and a first control command from a first control unit, wherein the first control unit comprises a first autopilot unit, an operating mode of the vehicle; and
transmit the operating mode to an autonomous driving system,
wherein the first control command is generated by a first control unit based on input from a first plurality of sensors,
wherein, in a case that an error is detected in the first control command, a second control command is generated by a second control unit based on input from a second plurality of sensors different from the first plurality of sensors, wherein the second control unit comprises a second autopilot unit, and
wherein the operating mode corresponds to at least one of (a) a default mode that allows the vehicle to operate without changing operating mode, (b) a first mode that allows the vehicle to pull over to a location, (c) a second mode that allows the vehicle to immediately stop, or (d) a third mode that allows the vehicle to come to a gentle stop,
switch the operating mode from the default mode to one selected from the first mode, the second mode, and the third mode,
wherein the vehicle is determined as healthy when its health parameter is between a third threshold value and a fourth threshold value, wherein the third threshold value and the fourth threshold value correspond to error or warning message received or any other related metric or criteria.

17. The device of claim 16, wherein the processor is further configured to:
(i) switch to operation in the first mode when determining the vehicle is healthy and either the first autopilot unit or the second autopilot unit is not healthy,
(ii) switch to operation in the second mode when determining the vehicle is not healthy or both the first autopilot unit and the second autopilot unit are not healthy, and
(iii) switch to operation in the third mode when determining the vehicle is healthy; switching to operation in the first mode is not available; and either the first autopilot unit or the second autopilot unit is not healthy.

18. The device of claim 16, wherein the processor is further configured to: make a first determination whether the vehicle is healthy; and make a second determination on a health status of the first autopilot unit and a health status of the second autopilot unit, wherein switching the operating mode is determined based on at least one of the first determination and the second determination.

19. The device of claim 16, further comprising: two power sources configured to power the first control unit and the second control unit.

20. The device of claim 16, further comprising: a first ignition signal received by the first control unit and a second ignition signal, different from the first ignition signal, received by the second control unit.

* * * * *